(12) United States Patent  
Williams

(10) Patent No.: US 9,139,369 B2  
(45) Date of Patent: Sep. 22, 2015

(54) SIDE WALL AND COVER SYSTEM FOR A CONVEYOR BELT

(71) Applicant: ASGCO Manufacturing, Inc., Allentown, PA (US)

(72) Inventor: Leroy C. Williams, Hellertown, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 0 days.

(21) Appl. No.: 14/338,879

(22) Filed: Jul. 23, 2014

(65) Prior Publication Data

US 2015/0027856 A1 Jan. 29, 2015

Related U.S. Application Data

(60) Provisional application No. 61/858,994, filed on Jul. 26, 2013.

(51) Int. Cl.
| | |
|---|---|
| *B65G 15/60* | (2006.01) |
| *B65G 45/10* | (2006.01) |
| *B65G 21/08* | (2006.01) |
| *B65G 15/08* | (2006.01) |

(52) U.S. Cl.
CPC ............... *B65G 15/60* (2013.01); *B65G 45/10* (2013.01)

(58) Field of Classification Search
None
See application file for complete search history.

(56) References Cited

U.S. PATENT DOCUMENTS

| | | | |
|---|---|---|---|
| 6,634,490 B2 * | 10/2003 | Fischer et al. ................ | 198/826 |
| 7,347,319 B2 | 3/2008 | Simoens et al. | |
| 7,497,325 B2 * | 3/2009 | Simoens et al. ........... | 198/836.1 |
| 7,798,314 B2 | 9/2010 | Simoens | |
| 2002/0011400 A1 | 1/2002 | Burkhart et al. | |
| 2008/0006514 A1 | 1/2008 | Ostman | |
| 2009/0294257 A1 | 12/2009 | Kuiper | |

FOREIGN PATENT DOCUMENTS

| | | |
|---|---|---|
| JP | 1996-225129 | 9/1996 |
| KR | 20-0191379 | 8/2000 |

OTHER PUBLICATIONS

International Search Report for corresponding PCT Application No. PCT/US2014/047978 dated Nov. 17, 2014.

* cited by examiner

*Primary Examiner* — Kavel Singh
(74) *Attorney, Agent, or Firm* — Caesar Rivise, PC

(57) ABSTRACT

A side wall and cover system for conveyor assemblies for containing particulates during conveyor operation. The invention utilizes rollers that are centrally positioned on corresponding support members which support a pair of angled wings the roller sides. These angled wings support impact bars that are aligned in the direction of conveyor movement and support a troughed conveyor belt. Side walls are secured to the angled wings and include an upper surface to which a cover is releasably secured. Seals and gaskets are positioned between confronting surfaces of these components to prevent dust particulates from emanating between the surfaces. The side walls permit additional conveying volume at the sides of the conveyor and a roller hanger is also provided to facilitate the servicing of such rollers without the need to lift the conveyor belt. Plural side wall/cover systems can be releasably secured together using side wall-projecting flanges and interlocking tabs.

27 Claims, 7 Drawing Sheets

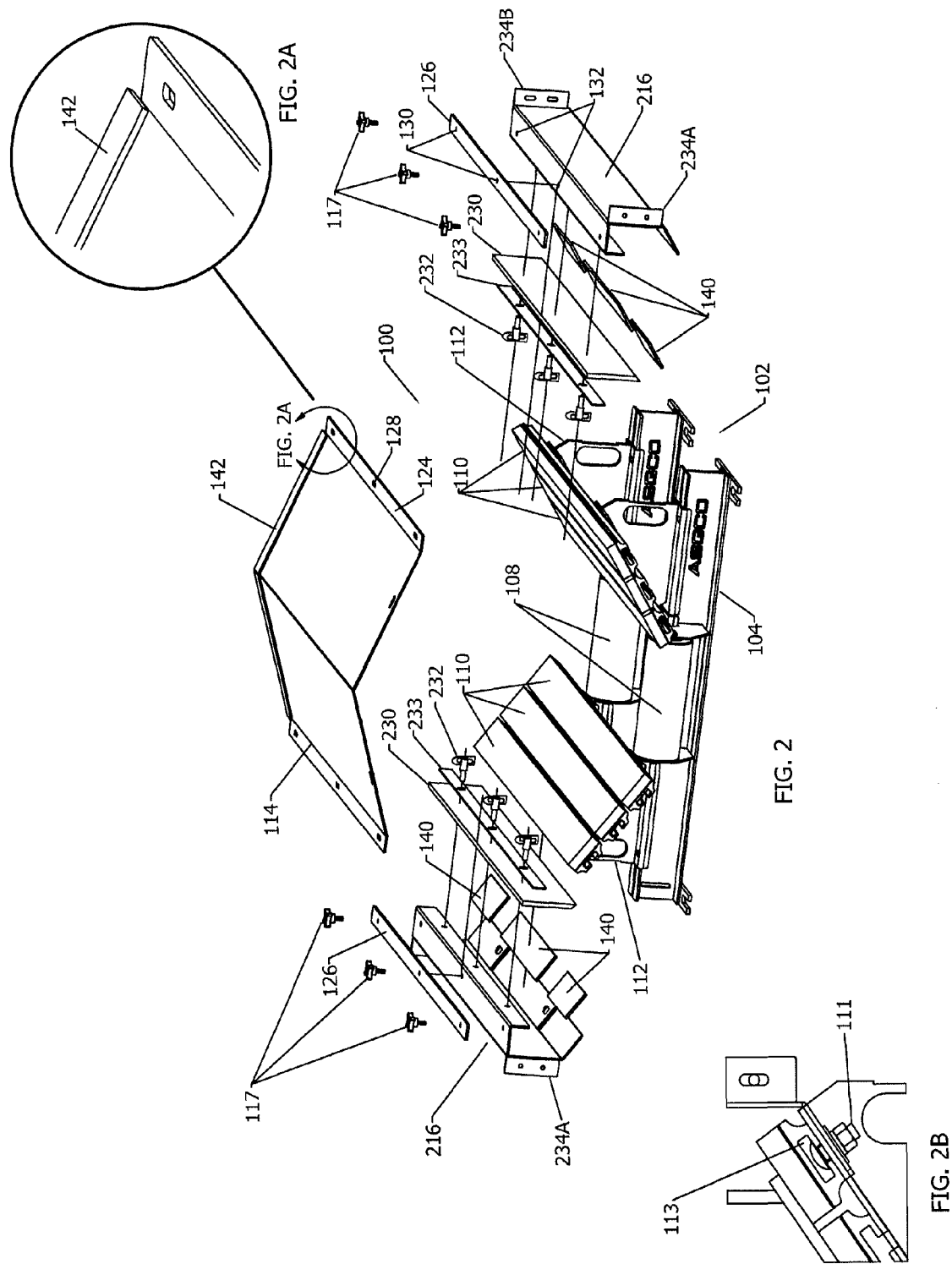

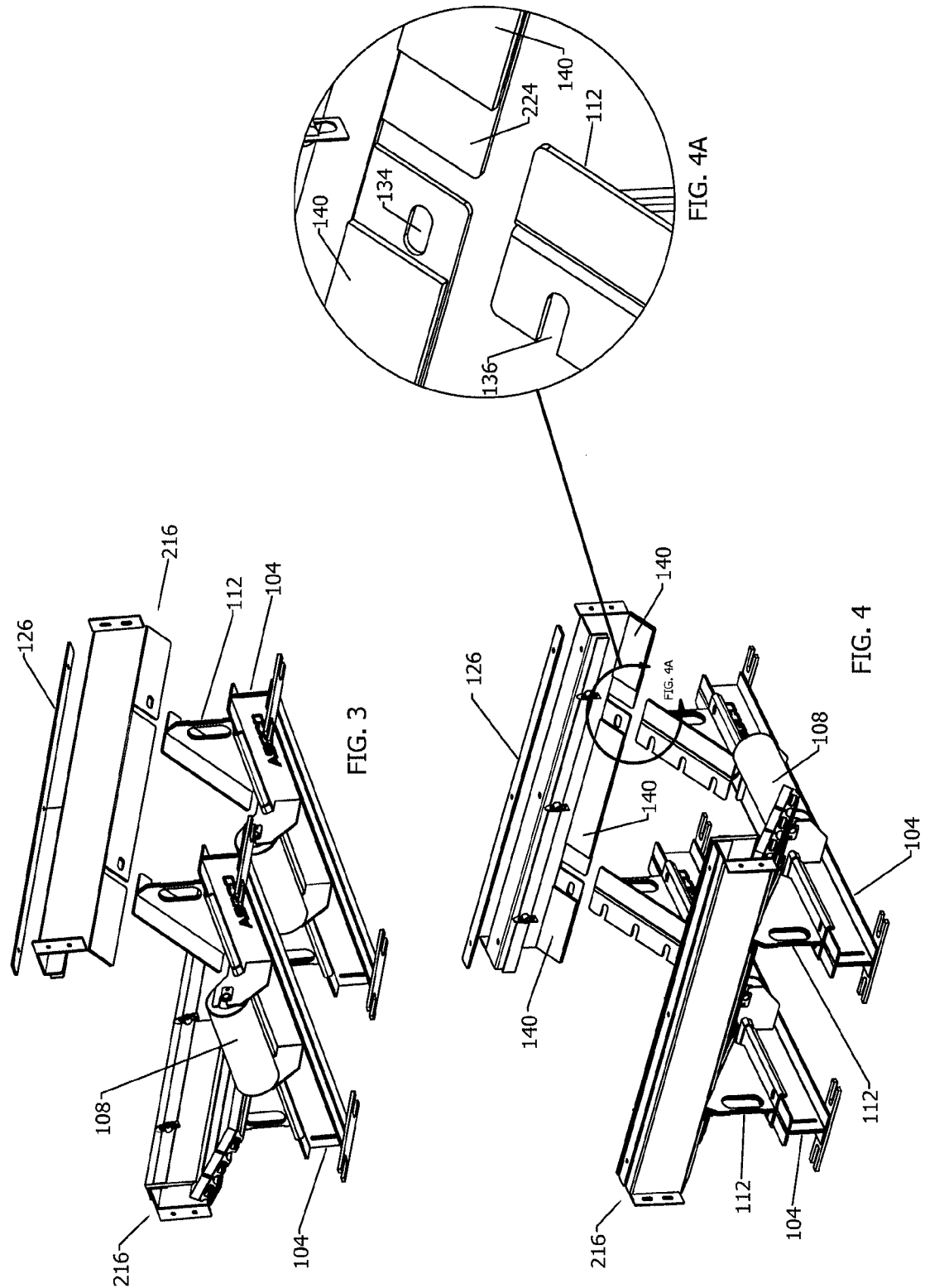

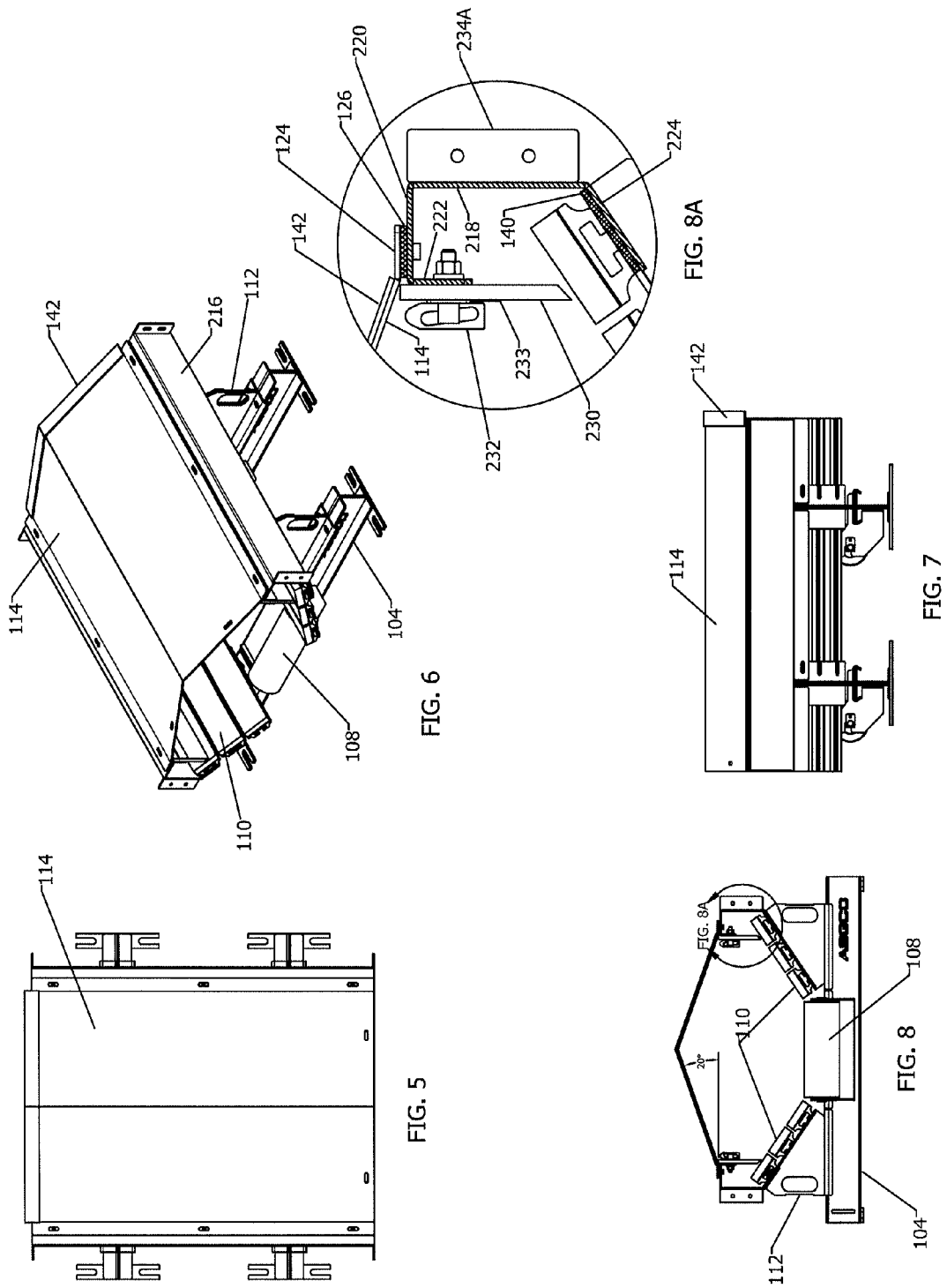

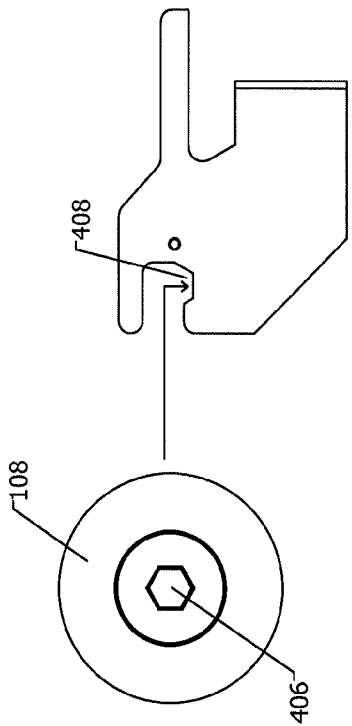
FIG. 12C
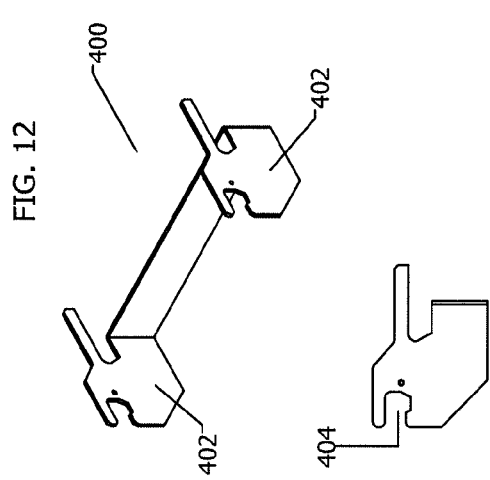
FIG. 12
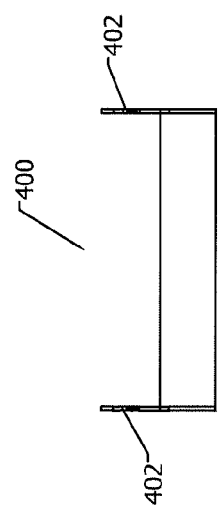
FIG. 12A
FIG. 12B

SIDE WALL AND COVER SYSTEM FOR A CONVEYOR BELT

CROSS-REFERENCE TO RELATED APPLICATIONS

This non-provisional application claims the benefit under 35 U.S.C. §119(e) of Application Ser. No. 61/858,994 filed on Jul. 26, 2013 entitled SIDE WALL AND COVER SYSTEM and whose entire disclosure is incorporated by reference herein.

BACKGROUND OF THE INVENTION

The present invention relates generally to conveyor assemblies and, more particularly, to a side wall and cover system for using with conveyor assemblies.

FIG. 1 shows a conventional endless conveyor belt assembly generally designated 10. The endless conveyor belt assembly 10 includes an endless troughing conveyor belt 11 extending around a head pulley 12 and a tail pulley 13, providing a carry side 11a and a return side 11b for the belt, which is supported by a belt support frame 14. There is provided along the belt support frame 14, a plurality of belt supports 19 supporting the conveyor belt 11 between the head pulley 12 and the tail pulley 13. The conveyor belt 11 is designed to transport aggregate or particulate material that is loaded onto the conveyor belt through a chute 15 in a loading zone 16. An impact bed 20 supports the belt 11 in the loading zone 16, in a manner as described above. The conveyor belt 11 carries the material away from the loading zone 16 and discharges the material at the head pulley 12 area.

When aggregate and particulate materials (e.g., coal, ore, precious metals, cement, minerals, grain, etc.) are loaded onto the conveyor belt 11, the impact of such materials tends to cause significant airborne dust. Such dust is particularly concentrated in the vicinity of the impact bed 20, where materials deposited thereon through the chute 15 hits the impact bed 20 with significant force, causing considerable amounts of dust. Dust also tends to be concentrated around the loading zone 16 in general, but can also be present around any point along the carry side 11a of the conveyor belt 11 while materials are being transported. Dust can be hazardous to the health of people who are in the vicinity of the loading zone 16 and conveyor belt 11. In addition, dust can damage or otherwise interfere with the proper and efficient operation of conveyor equipment.

Thus, there remains a need to minimize the dispersion of dust that tends to concentrate around conveyor equipment when aggregate or particulate materials are deposited onto and transported by a conveyor belt. One way to minimize the dispersion of dust around conveyor equipment is to provide a cover and walls respectively over and around the carry side of the belt 11, to contain such dust.

All references cited herein are incorporated herein by reference in their entireties.

BRIEF SUMMARY OF THE INVENTION

A containment system for minimizing the dispersion of dust from the depositing of aggregate or particulate materials onto and transported by a conveyor belt is disclosed. The system comprises: a plurality of support members each comprising a corresponding roller, centrally located and upon which the conveyor belt rides, and wherein each support member comprises an angled wing on each side of the corresponding roller; at least one impact bar located on each side of the conveyor belt and supported upon the angled wings and wherein the plurality of support members, rollers, angled wings and impact bars cooperate to form a trough configuration for conveying the deposited aggregate or particulate materials; a side wall coupled to each angled wing on each side of the conveyor belt; and a lid that is releasably secured to both side walls to form a cover over the conveyor belt, and wherein the lid and side walls act to contain and minimize the dispersion of dust around the conveyor belt.

A method for minimizing the dispersion of dust from the depositing of aggregate or particulate materials onto and transported by a conveyor belt is disclosed. The method comprises: forming a trough configuration, with the conveyor belt located at the lowest central portion thereof, for confining the conveyance of the deposited aggregate or particulate materials within the trough configuration; coupling a side wall along the sides of the trough configuration; and releasably coupling a lid to both sides of the trough configuration along the side walls to contain and minimize the dispersion of dust around the conveyor belt.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 is a perspective exploded view of a side wall and cover system and a slide-n-roll bed of the present invention;

FIG. 2A is an enlarged view from FIG. 2 showing a partial view of the cover interlock tab;

FIG. 2B is a partial side view of the interface between the uppermost impact bar, the angled wing and the side wall flat projection depicting how all three components are secured together;

FIG. 3 is a first perspective exploded view of a slide-n-roll bed and the walls and gasket of the side wall and cover system shown in FIG. 2;

FIG. 4 is a second perspective exploded view of a slide-n-roll bed and the walls and gasket of the side wall and cover system shown in FIG. 2;

FIG. 4A is an enlarged view of a portion of the slide-n-roll bed and the walls and gasket of the side wall and cover system shown in FIG. 4;

FIG. 5 is an overhead view of the side wall and cover system and slide-n-roll bed shown in FIG. 2;

FIG. 6 is a perspective view of an assembled side wall and cover system and slide-n-roll bed shown in FIG. 2;

FIG. 7 is a side view of the assembled side wall and cover system and slide-n-roll bed shown in FIG. 6;

FIG. 8 is an end elevation view of the side wall and cover system and slide-n-roll bed shown in FIGS. 6 and 7;

FIG. 8A is an enlarged view of a portion of the side wall and cover system shown in FIG. 8;

FIG. 12 is a perspective view of a center roll hanger of the present invention;

FIG. 12A is an end elevation view of the center roll hanger shown in FIG. 12;

FIG. 12B is a front view of the center roll hanger of FIGS. 12 and 12A;

FIG. 12C is an enlarged view of the end elevation view of the center roll hanger shown in FIG. 12A and an end elevation view of a roller being inserted therein.

DETAILED DESCRIPTION OF THE PREFERRED EMBODIMENTS

Figure 1:
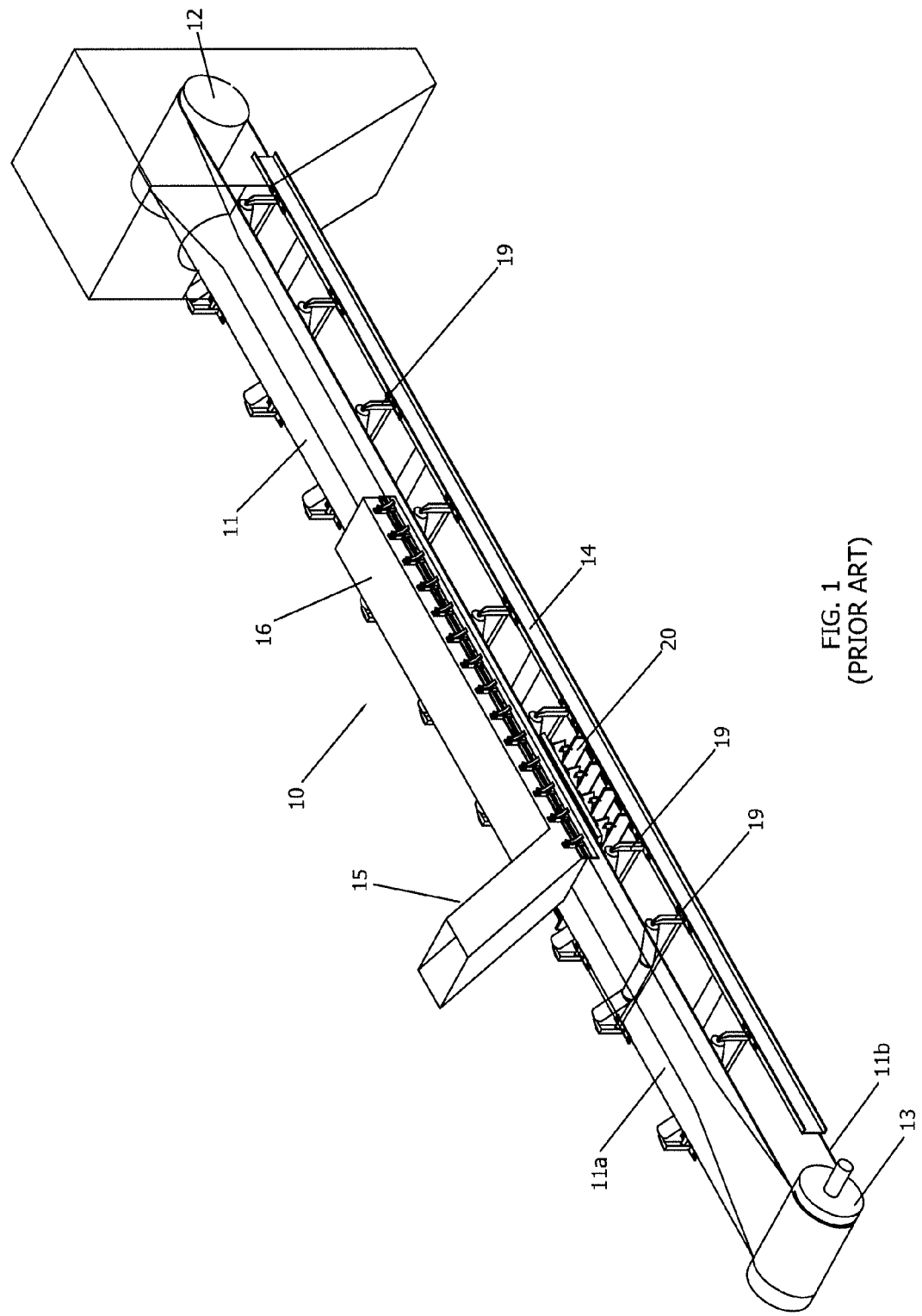
FIG. 1 is a perspective view of a prior art endless conveyer assembly for conveying material.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

Referring to FIGS. 2-11, there are shown various perspectives of an embodiment of a side wall and cover system 100 of the present invention that form a containment system. The side wall and cover system 100 as shown is installed onto a SLIDE-N-ROLL CONVEYOR SLIDER BED 102 (hereinafter, "slide-n-roll bed"), manufactured by ASGCO®. However, a person of ordinary skill in the art would appreciate that the side wall and cover system 100 could be installed onto other apparatuses that provide a troughing configuration for the carry side 11a of a conveyor belt 11, including, but not limited to, impact cradle beds, roller cassette conveyor belt impact beds and sliders, SLIDE-LERS™ (such as those made, e.g., by ASGCO®), and the like.

As shown in FIG. 2, the slide-n-roll bed 102 includes support members 104, which are longitudinally spaced from each other and are secured to the belt support frame (not shown). A horizontally oriented conveyor roller 108 is centrally positioned on each support member 104. On either side of each conveyor roller 108, resilient impact bars 110 are secured to and extend across the support members 104 on angled wings 112, running lengthwise in what would be the conveyor belt travel direction. The impact bars 110 are oriented at an angle on either side of each conveyor roller 108 to create a troughing angle for the carry side 11a of the conveyor belt 11. By way of example only, these angled wings 112 comprise an angle of approximately 35°, although various wing configurations could be used in the range of 20°-45°.

Through use, impact bars 110 and rollers 108 can become worn and in need of replacement. To replace or service the impact bars 110 or rollers 108, it is preferred that the wings 112 are releasable and outwardly slideable along the length of the support member 104, so as to render these components accessible for servicing or replacement.

The side wall and cover system 100 shown in FIGS. 2-11, includes a lid or cover 114 affixed to vertical walls 216 on either side thereof. The walls 216 are secured to the wings 112 of the slide-n-roll bed 102. The cover 114 is preferably made of a light material capable of maintaining structural integrity under its own weight, such as aluminum. In the embodiment shown, the cover 114 is gable-shaped, e.g., at an angle of 20°, although other angles and shapes (e.g., rounded) are contemplated. The exact shape of the cover 114 is less important than the fact that it allows for clearance of materials being transported on the belt 11 below. Thus, a portion of the wall 216 slides under wings 112 and is fastened via top bar bolts, as is discussed in more detail below.

Figure 9:
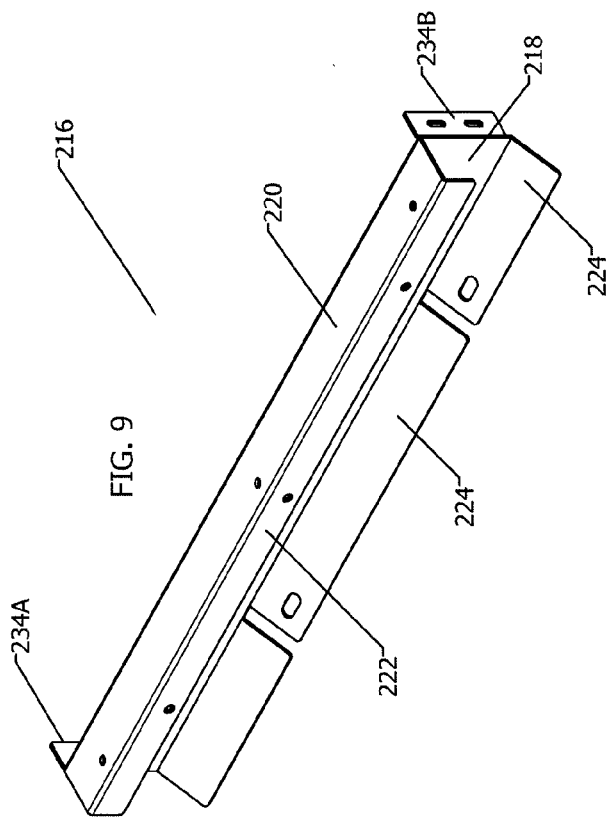
FIG. 9 is a perspective view of a wall of the side wall and cover system shown in FIGS. 2-11.
Figure 10:
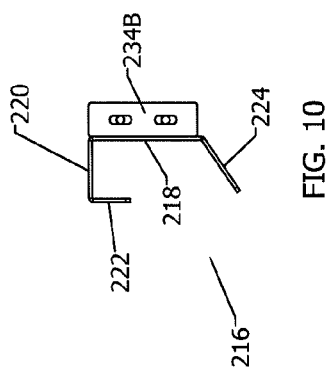
FIG. 10 is an end elevation view of the wall shown in FIG. 9.
Figure 11:
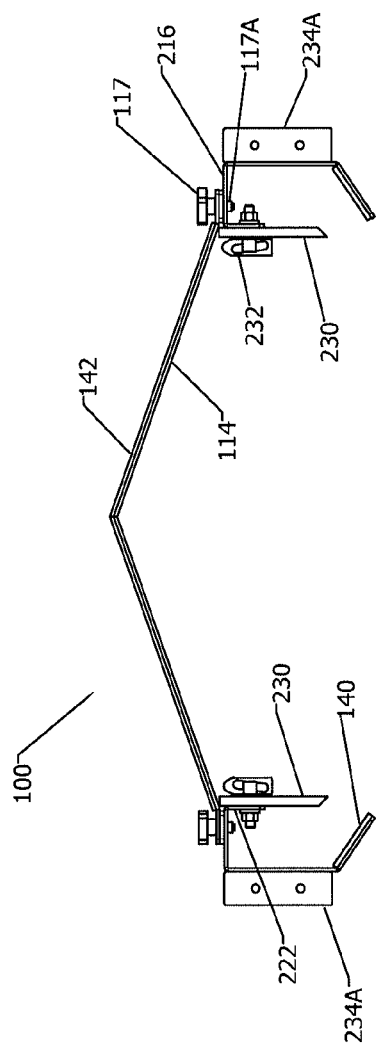
FIG. 11 is an end elevation view of the assembled side wall and cover system.

Referring to FIGS. 8A, 9 and 10, each wall 216 includes a preferably vertical wall portion 218, a preferably horizontal inwardly projecting ridge 220 (FIG. 10) extending from the top of the wall portion 218 and flat projection 224 extending inwardly at a downward angle from the bottom of the wall portion 218 (as used "inwardly" refers to a direction towards the center of the slide-n-roll bed 102.). The angle of the flat projection 224 conforms to the angle of the angled wing 112. This side wall configuration, i.e., the vertical wall portion 218 with the horizontal inwardly projecting ridge 220, provides additional conveying volume at the sides of the conveyor, as can be mostly clearly seen from FIG. 8A. On either side of the cover 114 is a flat lip 124 (FIG. 2). The lip 124 of the cover 114 is adapted to rest above the ridge 220 of the wall 216. Preferably, a gasket 126 (FIG. 2) is positioned between the ridge 220 and the lip 124. The lip 124 of the cover 114 is secured to the gasket 126 and ridge 220, thereby securing the cover 114 to the wall 216 via hand knobs, bolts or other fasteners 117 (FIGS. 2 and 11) that may be inserted through holes 128, 130 and 132 respectively (see FIG. 2) located in the lip 124, gasket 126 and ridge 220. Thus, the lid 114 is attached to walls 116 via hand knobs 117 and the wall 116 is flanged outward. As can be most clearly seen in FIG. 11, corresponding cinch nuts 117A are press fitted into the ridge holes 132 for receiving the hand knobs 117 therein.

The projection 224 preferably slides under an upper/outer portion of each wing 112 to enable securing the wall 216 to each wing 112. To secure the projection 224 to each wing 112, bolts or other fasteners located in the back side of the uppermost impact bar 110 are used to pass through apertures in the angled wing 112 and the projection 224. In particular, top bolts or other fasteners 111 (FIG. 2B) have their heads trapped within a channel 113 on the back side of the uppermost impact bar 110. When the uppermost impact bar 110 is brought into the vicinity of the angled wing 112, the shank of the fastener 111 is inserted through the slot 136 of the angled wing and through the aperture 134 in the projection 224 (FIG. 4A). The slot 136 allows for adjustment during this securing process. A nut can be secured to the shank of the fastener 111 (FIG. 2B) to lock the components together. Preferably, rubber pads 140 are positioned on the upper side of each projection 224 and adjacent to each wing 112 so as to provide a seal between the wall 216 and each wing 112. The rubber seal 140 is secured (e.g., adhesively secured) to the projection 224 and overlaps a section of the belt 11 so as to prevent dust and particulate from escaping the confines of the side wall/cover system 100 and spreading over the side and underneath the belt 11.

An inside seal element 230 (FIG. 11) is secured to the flat projection 222 of wall 216 also to prevent dust and particulate from escaping the confines of the side wall/cover system 100 and spreading over the side and underneath the belt 11. This inside seal element 230 comprises a rubber material and is secured to the projection 222 using wedge clamps 232 that secure a seal bar 233 (e.g., an aluminum panel) and the inside seal element 230 to the projection 222. As shown most clearly in FIG. 2, the seal bar 233 prevents the wedge clamps 232 from distorting the upper edge of the inside seal element 230 as the wedge clamps 232 are tightened against the projection 222.

The cover 114 preferably includes an interlock tab 142 (FIGS. 2-2A) positioned respectively on near and/or far edges thereof (as used herein, "near edge" of the cover 114 refers to a first edge under which the belt 11 runs while "far edge" of the cover 114 refers to a second edge under which the belt 11 runs). It is contemplated that the cover 114 can be part of a modular set, i.e., adapted to mate with and create a seal between other cover sections over a determined length of the belt 11. Modular compatibility of covers with one another is advantageous in that it allows a user to remove only a single cover from a plurality of covers when necessary, e.g., to gain access to the area directly below a specific cover. The interlock tab 142 is adapted to secure each cover to an adjacent cover.

Figure 13:
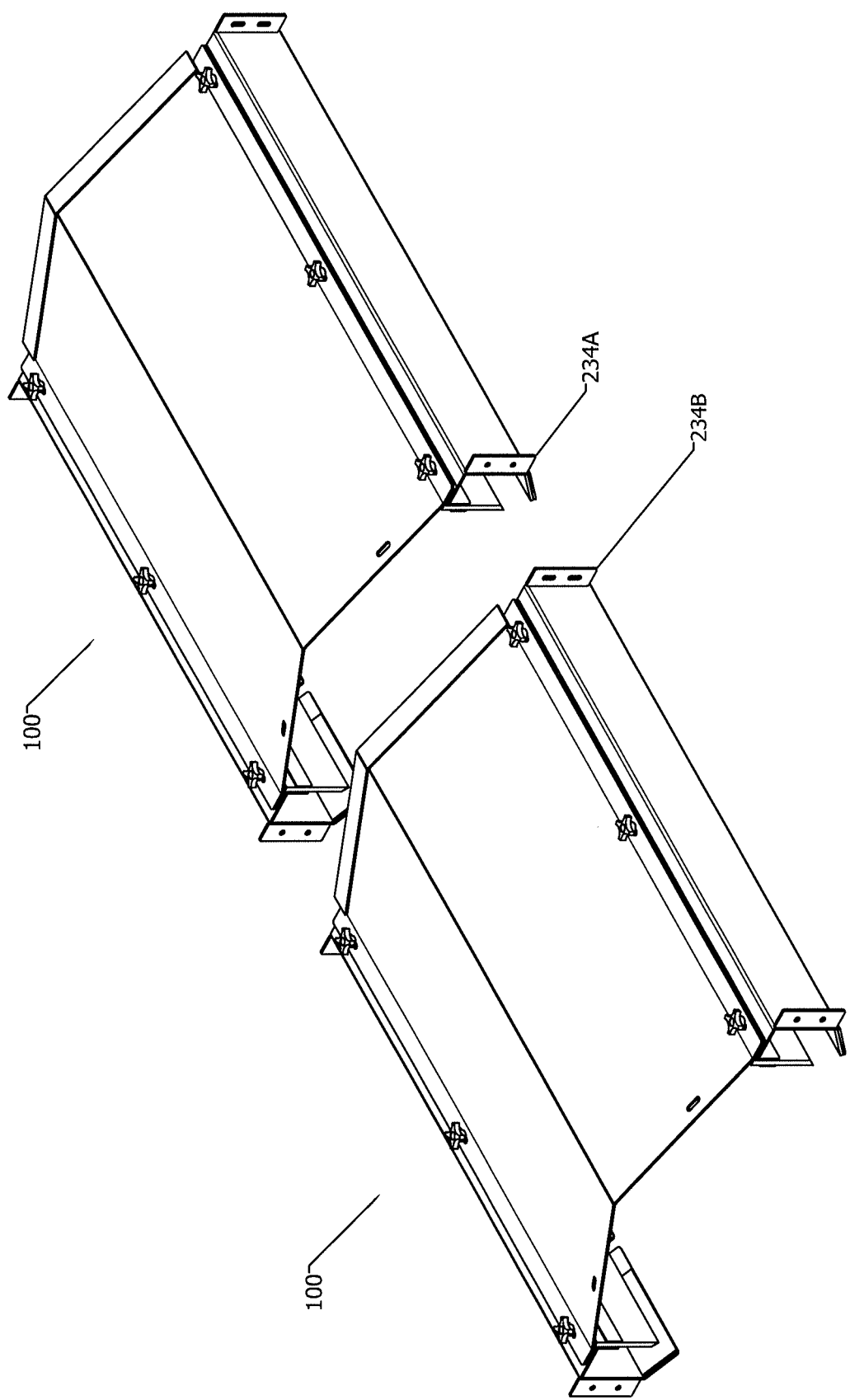
FIG. 13 shows two side wall/cover systems aligned for securing together.

Furthermore, in order to permit a series of side wall/cover systems 100 to be releasably coupled together, each side wall 216 comprises fore and aft flanges 234A/234B that project outwardly from the wall. See FIG. 13. These flanges 234A/234B are preferably welded to the vertical wall portion 218. The fore flange 234A comprises a pair of vertically-oriented holes while the aft flange 234B comprises a pair of vertically-oriented slots. A second side/cover system 100 can be located in front of and behind another system 100 as shown in FIG. 13. The slots in the aft flange 234B of a first side wall/cover system 100 allow a bolt (not shown) to be adjustable which then passes through a corresponding hole in the fore flange 234A of the adjacent side wall/cover system 100.

Removing or replacing a roller 108 can be time consuming and inconvenient. Accordingly, there is shown in FIGS. 12-12C, a center roll hanger 400 that may be used to retain a roller 108, e.g., in the slide-n-roll bed 102. The advantage of this embodiment of the center roll hanger 400 is that it does not require a user to remove a sidewall and cover system 100 to remove or replace a roller 108 therefrom/thereto.

The center roll hanger 400 includes flanges 402, each of which has a horizontally-oriented notch 404 adapted to receive a hexagonal roller protrusion 406, which extends outwardly from each side of the roller 108. The horizontal-orientation of the notch 404 enables the roller to be inserted in and removed from the center roll hanger 400 in a horizontal direction. The 404 preferably includes a slight vertical indent 408 (e.g., ¼ of an inch deep, as shown in FIG. 12C) adapted to mate with the hexagonal roller protrusion 406. The roller 108 may be secured via a clip attachable to the side of each flange 402.

This configuration of the center roll hanger 400 avoids the need to lift the belt 11 much, if at all, and enables a user to remove/replace the roller without having to remove the sidewall and cover system 100. It should be understood that while a hexagonal mating configuration between the notch 404 and roller protrusion 406 is preferred, other interlocking geometric configurations are contemplated, including, but not limited to, square, triangular, rectangular, trapezoidal, pentagonal, heptagonal, octagonal, interlocking teeth or bumps, and the like.

Accordingly, in one aspect, the present invention comprises a novel sidewall and cover system 100. In another aspect, the present invention includes a novel center roll hanger 400 having flanges 402, each of which comprises a horizontally-oriented notch 404. This configuration permits the removal and replacement of rollers from a slide-n-roll bed 102 or the like, that avoids the need to remove a sidewall and cover system 100, if such system is secured to a slide-n-roll bed 102 (or the like). Thus, the center roll hanger 400 allows the roller 108 to be removed/replaced without having to slide out a wing 112 and center slide assembly.

While the invention has been described in detail and with reference to specific examples thereof, it will be apparent to one skilled in the art that various changes and modifications can be made therein without departing from the spirit and scope thereof.

What is claimed is:

1. A containment system for minimizing the dispersion of dust from the depositing of aggregate or particulate materials onto and transported by a conveyor belt, said system comprising:
   a plurality of support members each comprising a corresponding roller, centrally located and upon which the conveyor belt rides, and wherein each support member comprises an angled wing on each side of said corresponding roller;
   at least one impact bar located on each side of the conveyor belt and supported upon said angled wings and wherein said plurality of support members, rollers, angled wings and impact bars cooperating to form a trough configuration for conveying the deposited aggregate or particulate materials;
   a side wall coupled to each angled wing on each side of the conveyor belt;
   a seal element positioned inwardly of said side wall for preventing particulates from spreading over said sidewall; and
   a lid that is releasably secured to both side walls to form a cover over the conveyor belt, said lid and side walls acting to contain and minimize the dispersion of dust around the conveyor belt.

2. The containment system of claim 1 wherein each of said angled wings comprises a surface that is angled downward towards the conveyor belt.

3. The containment system of claim 2 wherein the side wall comprises a first portion that includes an angled portion, similar to said angled wing, for securing said side wall to said angled wings.

4. The containment system of claim 3 wherein the side wall comprises a second portion that is horizontal for receiving a corresponding lid member portion thereon, said first portion and said second portion being coupled together by a wall portion.

5. The containment system of claim 4 wherein said second portion projects inwardly of said side wall.

6. The containment system of claim 5 further comprising a third portion coupled to said second portion, and wherein said seal element comprises a rubber seal member that is coupled to said third portion, said rubber seal member being positioned over at least one impact bar.

7. The containment system of claim 4 wherein said wall portion comprises flanges that project outwardly away from said conveyor belt, one of said flanges being located at a first end of said wall portion and another one of said flanges being located at a second end of said wall portion, each of said flanges comprising apertures to permit a fastener to pass therethrough to releaseably couple another containment system, having corresponding flanges and apertures, to said wall portion.

8. The containment system of claim 7 wherein said apertures in one of said flanges are slotted to permit said fastener to be adjustable in releasably coupling said another containment system to said wall portion.

9. The containment system of claim 7 wherein said lid comprises interlocking tabs located on opposite sides of said lid and wherein said opposite sides are positioned over the conveyor belt, each of said interlocking tabs interlocking with an adjacent lid of said another containment system.

10. The containment system of claim 3 wherein one of said impact bars comprises fasteners each having a head that is trapped in a first side of said one of said impact bars, each of said fasteners having a shank that passes through a respective aperture in said angled wing and in said first portion when said first side is positioned against said first portion.

11. The containment system of claim 10 further comprising pads that are secured to said first portion on either side of said angle wings for providing a seal.

12. The containment system of claim 1 wherein each roller is coupled to a corresponding support member via a center roll hanger, said center roll hanger comprising flanges on each side and wherein each flange comprises a horizontally-oriented notch for receiving a corresponding roller protrusion therein.

13. The containment system of claim 12 wherein each of said horizontally-oriented notches comprises a vertical indent adapted to mate with said corresponding roller protrusion.

14. A method for minimizing the dispersion of dust from the depositing of aggregate or particulate materials onto and transported by a conveyor belt, said method comprising:
    forming a trough configuration, with the conveyor belt located at the lowest central portion thereof, for confining the conveyance of the deposited aggregate or particulate materials within the trough configuration;
    coupling a side wall along the sides of the trough configuration and positioning a seal element inwardly of said side wall; and
    releasably coupling a lid to both sides of said trough configuration along the side walls to contain and minimize the dispersion of dust around the conveyor belt.

15. The method of claim 14 wherein said step of forming a trough configuration comprises:
    centrally locating a plurality of rollers on a corresponding a plurality of support members for supporting conveyor belt movement on said rollers;
    securing an angled wing on each side of said corresponding roller; and
    providing at least one impact bar on each side of the conveyor belt and supported upon said angled wings.

16. The method of claim 15 wherein said step of securing an angled wing comprises orienting a surface downwardly towards the conveyor belt.

17. The method of claim 16 wherein said step of coupling a side wall comprises forming a side wall having a first portion that includes an angled portion, similar to said angled wing, for securing said side wall to said angled wings.

18. The method of claim 16 wherein said step of coupling a side wall further comprises forming a side wall having a second portion that is horizontal for receiving a corresponding lid member portion thereon, and wherein said first portion and said second portion are coupled together by a wall portion.

19. The method of claim 18 wherein said step of coupling a side wall further comprises forming said second portion to project inwardly of said sidewall.

20. The method of claim 19 wherein said step of forming said second portion comprises:
    coupling a third portion coupled to said second portion; and
    coupling said seal element to said third portion such that said seal element is positioned over at least one impact bar, and wherein said seal element comprises a rubber seal member.

21. The method of claim 18 further comprising the steps of:
    securing flanges to said wall portion that project outwardly away from said conveyor belt, one of said flanges being located at a first end of said wall portion and another one of said flanges being located at a second end of said wall portion, said flanges comprising apertures for receiving fasteners therethrough;
    aligning another containment system, having said flanges with apertures, with said flanges and apertures of said wall portion; and
    passing said fasteners through said aligned apertures of said flanges in said wall portion and of said apertures in said flanges of said another containment system to releasably couple said wall portion with said another containment system.

22. The method of claim 21 wherein said step of securing flanges comprises forming slotted apertures in one of said flanges of said wall portion and forming rounded holes in the other one of said flanges, said slotted apertures permitting said fasteners to be adjustable in releasably coupling said wall portion with said another containment system.

23. The method of claim 22 wherein said step of releasably coupling at least one lid comprises:
    forming interlocking tabs on opposite sides of said lid, said opposite sides being positioned over the conveyor belt; and
    interlocking each of said tabs with an adjacent lid of said another containment system.

24. The method of claim 17 wherein said step of coupling a side wall comprises:
    trapping a head of a plurality of fasteners within a first side of one of said impact bars; and
    passing a shank of each one of said plurality of fasteners through a respective aperture in said angled wing and in said first portion when said first side is positioned against said first portion.

25. The method of claim 24 further comprising the step of securing pads to said first portion on either side of said angle wings for providing a seal.

26. The method of claim 15 wherein said step of centrally locating a plurality of rollers comprises forming a center roll hanger having flanges on each side and forming a horizontally-oriented notch on each flange for receiving a roller protrusion therein.

27. The method of claim 26 further comprising the step of forming a vertical indent adapted to mate with said corresponding roller protrusion.

* * * * *